United States Patent [19]

Kamiya et al.

[11] 4,177,023

[45] Dec. 4, 1979

[54] PNEUMATIC SYSTEM FOR SMOOTHING DISCHARGE PRESSURE FROM AIR

[75] Inventors: Tamotsu Kamiya, Kariya; Shigeru Miyao, Toyoda, both of Japan

[73] Assignee: Toyota Jidosha Kogyo Kabushiki Kaisha, Toyoda, Japan

[21] Appl. No.: 788,450

[22] Filed: Apr. 18, 1977

Related U.S. Application Data

[63] Continuation of Ser. No. 586,589, Jun. 13, 1975, abandoned.

[30] Foreign Application Priority Data

Feb. 25, 1975 [JP] Japan .................................. 50-25697

[51] Int. Cl.² .............................................. F04B 11/00
[52] U.S. Cl. ...................................... 417/540; 138/31
[58] Field of Search .................. 417/540, 542; 60/413, 60/415; 138/30, 31

[56] References Cited

U.S. PATENT DOCUMENTS

| | | | |
|---|---|---|---|
| 567,533 | 9/1896 | Bostwick | 417/540 |
| 2,290,479 | 7/1942 | Mercier | 417/540 |
| 2,579,840 | 12/1951 | Levy | 60/413 |
| 2,853,229 | 9/1958 | Dolz | 417/540 X |
| 3,336,948 | 8/1967 | Lucien | 138/31 |
| 3,348,563 | 10/1967 | Sidlec | 137/101 |
| 3,442,292 | 5/1969 | Jacuzzi | 138/30 |
| 3,454,050 | 7/1969 | Wolf | 138/31 |
| 3,804,125 | 4/1974 | Sonneman | 417/540 |

*Primary Examiner*—Richard E. Gluck
*Attorney, Agent, or Firm*—Stevens, Davis, Miller & Mosher

[57] ABSTRACT

A pneumatic system consisting of an air pump, air-passage switching means, operating components and air pipes connecting those together. This pneumatic system features improvements in a pressure smoothing means for smoothing a surge pressure discharged from an air pump in the pneumatic system, which pressure smoothing means is built in the pneumatic system between the air pump and the air-passage switching means. The pressure smoothing means includes an air chamber having an air inlet and an air outlet, and means for increasing and decreasing the volume of the air passage defined between the aforesaid air inlet and outlet, commensurate to the surging discharge pressure from the air pump, i.e., in response to the surge pressure of the air being admitted in the air chamber. This pressure smoothing means is provided with a pressure receiving plate which is displaced under the air pressure being introduced into the air chamber, whereby the volume of the air passage defined within the air chamber may be adjusted.

1 Claim, 8 Drawing Figures

PNEUMATIC SYSTEM FOR SMOOTHING DISCHARGE PRESSURE FROM AIR

This is a continuation of application Ser. No. 586,589 filed June 13, 1975, now abandoned.

BACKGROUND OF THE INVENTION

This invention relates to improvements in a pneumatic system consisting of an air pump, air-passage switching means, operating components and air pipes connecting those together, and more particularly to a pressure smoothing means for smoothing surge pressure being discharged from the air pump in the pneumatic system.

In general, the air pressure being discharged from an air pump surges at a considerably large amplitude. Thus, when such an air pressure is intact introduced to an operating component by way of an air-pressure switching means such as a valve and the like, then not only the air-passage switching means but also the operating components produce abnormal sound and vibration, and hence being about air leakage from air sealing portions thereof due to the aforesaid vibration, thus leading to trouble in a valve or operating components. Accordingly, it has been long desired to provide means for smoothing to a maximum extent the air surge-pressure being applied through a pneumatic circuit.

SUMMARY OF THE INVENTION

It is accordingly a principal object of the invention to provide a pneumatic circuit which avoids the aforesaid shortcomings by building in said circuit a simple mechanism which may smooth the air surge-pressure being discharged from an air pump and which is disposed between an air pump and an air-passage switching means, the aforesaid circuit consisting of an air pump, air-passage switching means, operating components and air pipes connecting those together.

It is another object of the invention to provide a pressure smoothing circuit for smoothing the air surge-pressure being discharged from an air pump, which circuit does not occupy a large space and may be used, without a need to modify any operating components.

According to the present invention, there is provided a pneumatic circuit which includes an air pump, air-passage switching means, operating components and air pipes connecting those together and which may reduce vibration in the air-passage switching means and operating components and is free from unwanted sound or noise, by providing a pressure smoothing means which is built in between the air pump and the air-passage switching means in the circuit for the purpose of smoothing the air surge-pressure being discharged from the air pump. The pressure smoothing means according to the present invention is simple in construction and may be used with ease at no additional manufacture cost.

DESCRIPTION OF THE PREFERRED EMBODIMENTS

Figure 2:
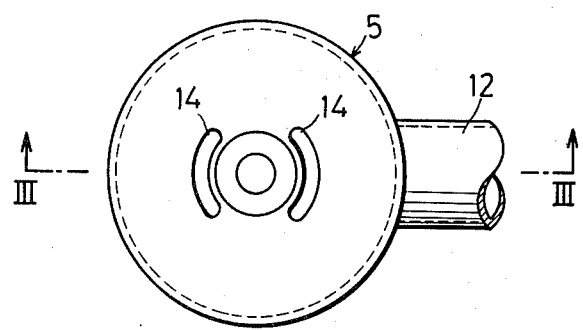
FIG. 2 is a plan view of the pressure smoothing means which plays a essential role of the invention.
Figure 3:
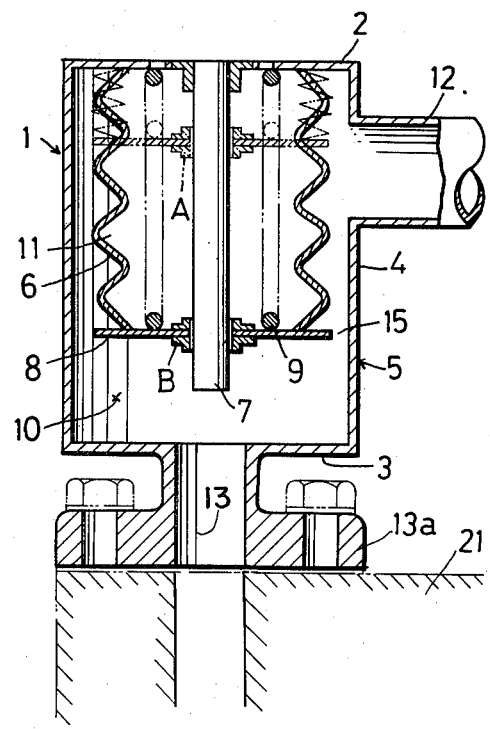
FIG. 3 is a longitudinal cross-sectional view taken along the line III—III of FIG. 2.

As shown in FIGS. 2 and 3, a pressure smoothing means 1 consists of: a cylindrical chamber 5 defined by a top plate 2, a bottom plate 3 and a peripheral wall 4; and a bellows 6 which is extendable in the axial direction of the chamber 5, depending on the variation in the air pressure prevailing in the chamber 5, the bellows 6 being housed in the chamber 5. Extending through the top plate 2 into the chamber 5 is a guide shaft 7, on which is slidingly fitted a pressure receiving plate 8. A clearance 15 is provided between the peripheral wall 4 of the chamber 5 and the pressure receiving plate 8 so as not to hinder the flow of the air. The bellows 6 is secured to the pressure receiving plate 8 and the top plate 2 at its opposite ends but in air-tight relation, respectively, while a compression spring 9 having a given strength is housed within the bellows 6. As a result, the chamber 5 is divided by the bellows 6 into an air chamber 10 and a bellows chamber 11 in air-tight relation. Defined in the peripheral wall 4 adjacent to the top plate 2 is an outlet 12, while an inlet 13 is defined in the bottom plate 3 and directed in coaxial relation to the guide shaft 7. Also defining the inlet 13 outwardly thereof is a flange 13a, by means of which the pressure smoothing means 1 is secured to an attaching support 21. Meanwhile, also defined in the top plate 2 are slots 14 which serve to communicate the interior of the bellows chamber 11 with atmosphere. Accordingly, acting on the pressure receiving plate 8 within the bellows chamber 11 are the urging force of the compression spring 9 and atmospheric pressure. Thus, the resultant force of the aforesaid urging force and atmospheric pressure will balance with the force of the pressure receiving plate 8 acting on the pressure receiving plate 8, which force is created by the air pressure within the air chamber 10. The outlet 12 is communicated with operating components 17, 18 by way of air-passage switching means 16, while the inlet 13 is communicated with an air pump 19.

With the aforesaid arrangement, when the pressure within the air chamber 10 exceeds the average value of the surge pressure from the air pump 19, then the bellows is contracted, and thus the pressure receiving plate 8 is retracted to the position A shown, upon application of the maximum air pressure in the air chamber 10. It follows that the volume of the air chamber 10 is increased and the air within the chamber 10 is discharged through the outlet 12, with its pressure being reduced. Conversely, when the pressure prevailing in the air chamber 10 is lowered, as compared with the average value of the surge pressures of the air, then the bellows extends under the action of the spring 9 and the pressure receiving plate 8 moves forwards to the position B shown at the lowest air pressure in the chamber 10, so that the volume of the chamber 10 or air passage is decreased, thereby increasing the pressure of air therein which is being discharged through the outlet 12 outside.

Figure 1:
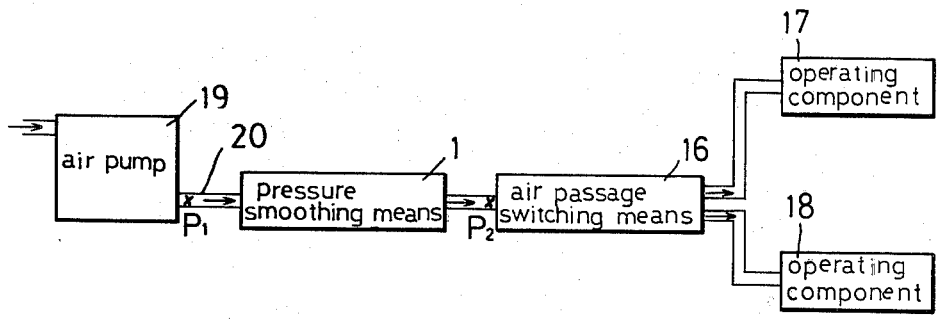
FIG. 1 is a block diagram of the pneumatic system according to the invention.
Figure 4:
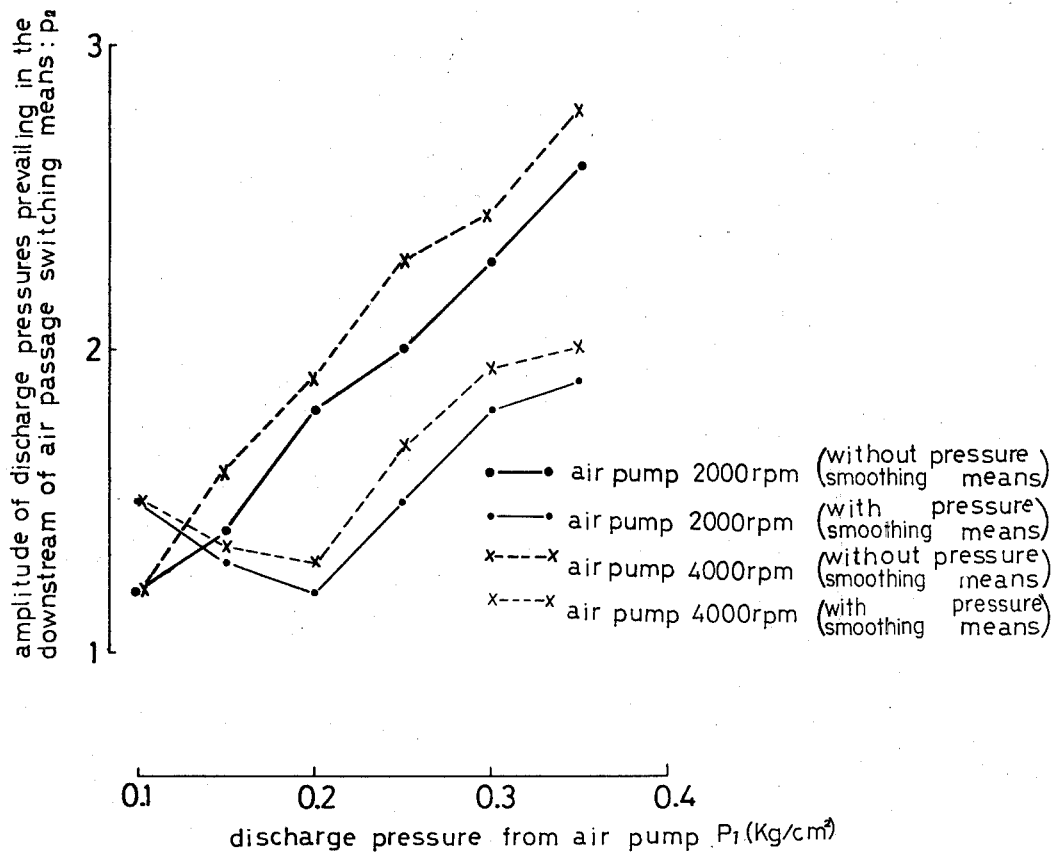
FIG. 4 is a plot showing the effects of the pressure smoothing means according to the present invention.

FIG. 4 shows a plot representing the effects of a pressure smoothing circuit, in which the aforesaid pressure smoothing means 1 is built in an air pipe 20 between the air pump 19 and the air-passage switching means 16. The discharge pressure P1 from the air pump 19 is represented by an abscissa, while the amplitude P2 of discharge pressure prevailing in the downstream of the air-passage switching means 16 is represented by an ordinate. It can be seen from this that the pressure smoothing circuit according to the present invention may reduce the amplitude of the surge pressure to a large extent, as compared with the discharge pressures from the air pump 19 in a circuit which is provided with no pressure smoothing means.

Figure 5:
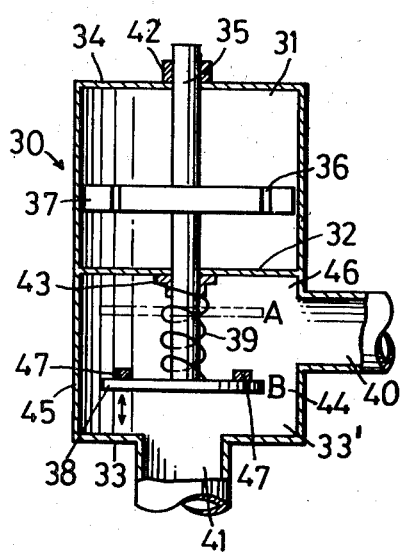
FIG. 5 is a longitudinal cross-sectional view of another pressure smoothing means according to the present invention.

FIG. 5 shows a modification of the pressure smoothing means shown in FIGS. 2 and 3. With this modified pressure smoothing means 30, a cylindrical chamber 46 is defined by a circular top plate 34, a circular bottom plate 33 and a peripheral wall 45 surrounding the aforesaid plates 33, 34, while a partition wall 32 is provided within the cylindrical chamber 46 in parallel with the top plate 34, so that the chamber 46 is divided by the partition wall 32 into an oil chamber 31 filled with oil and an air chamber 33' located under the partition wall 32. A rod 35 slidingly extends through the top plate 34 of the oil chamber 31 as well as the partition wall 32 in their centers but in oil tight relation thereto, while a piston 37 having through-holes 36 is secured to the rod 35 within the oil chamber 31, with a pressure receiving plate 38 being secured to the lower end of the rod 35 within the air chamber 33'. Confined between the pressure receiving plate 38 and the partition wall 32 is a compression spring 39. Defined in the bottom plate 33 of the air chamber 33' in its center but in opposing relation to the pressure receiving plate 38 is an inlet 41 which communicates with the air pump 19 and is directed in coaxial relation to the rod 35. In addition, an outlet 40 is defined in the peripheral wall 45 of the air chamber and communicates with the air-passage switching means 16. Shown at 42, 43 are seal members provided between the rod 35 and the top plate 34 and between the rod 35 and the partition wall 32.

Meanwhile, a clearance 44 is provided between the pressure receiving plate 38 and the peripheral wall 33b of the air chamber 33'.

In operation of the pressure smoothing means 30, when the pressure of the air being discharged from the air pump 19 exceeds the average value of the surge pressure, then the pressure receiving plate 38 is lifted to the position A shown, at the maximum pressure level, against the force of the compression spring 39 and the resistance of oil which passes through the through-holes 36. As a result, the high surge pressure of the air is lowered and the air is thus discharged through the outlet 41.

When the surge pressure of the air being discharged from the air pump 19 is lower than the average value of the surge pressures of the air, then the pressure receiving plate 38 is lowered to the position B shown under the action of the compression spring 39. As a result, the pressure of the surging air is raised from the lower level, and the air is thus discharged through the outlet 40. Shock absorbing piece 47 is provided on the pressure receiving plate 38 for absorbing the shock against the partition wall 32.

Figure 6:
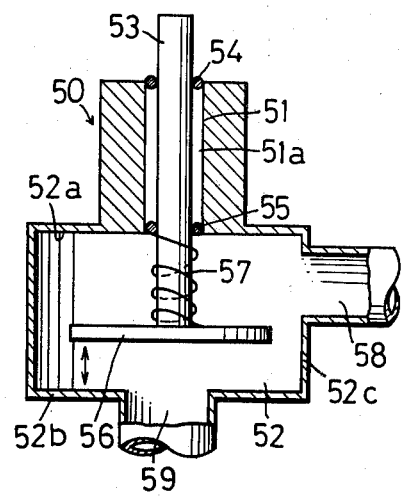
FIG. 6 is a longitudinal cross-sectional view of a further pressure smoothing means according to the present invention.

The pressure smoothing means 50 as shown in FIG. 6 consists of a cylindrical oil chamber 51 and an air chamber 52 located thereunder. The air chamber 52 is defined by a circular top plate 52a, a circular bottom plate 52b and a circular peripheral wall 52c which surrounds those plates 52a and 52b, while the oil chamber 51 is located in the center portion of the top plate 52a, being secured thereto. O-rings 54, 55 are mounted in the top and bottom ends of the oil chamber 51, thus sealing the oil chamber 51. A pressure receiving plate 56 is attached to the lower end of the rod 53 within the air chamber 52. A compression spring 57 encompasses the rod 53, being confined between the pressure receiving plate 56 and the top plate 52a of the air chamber 52. An inlet 59 is defined in the bottom plate 52b of the air chamber 52 in coaxial relation to the bottom plate 52b, while an outlet 58 is defined in the peripheral wall 52c. With the pressure smoothing means 50, oil of a high viscosity is contained in the oil chamber 51, so that the rod 53 has to move against the resistance of the oil.

Detailed description of the operation of the pressure smoothing means 50 is omitted because of the similarity of the operation to that of the pressure smoothing means 40.

Figure 8:
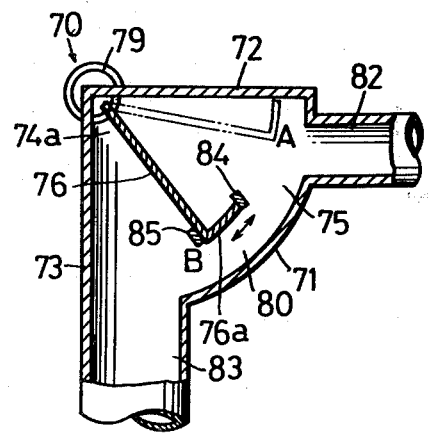
FIG. 8 is a cross-sectional view taken along the line VIII—VIII of FIG. 7.
Figure 7:
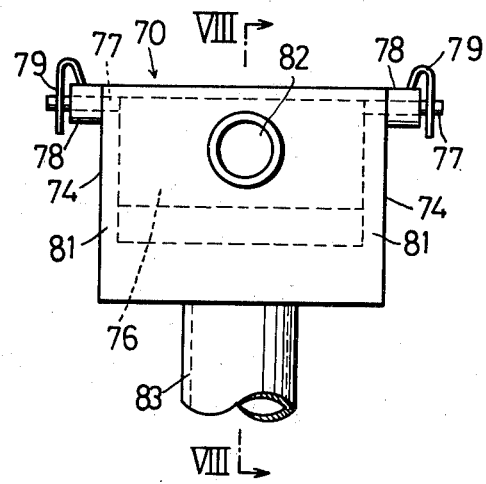
FIG. 7 is a front view of a still further pressure smoothing means according to the present invention.

With the pressure smoothing means 70 as shown in FIGS. 7 and 8, an air chamber 75 is defined by a top plate 72 an upright wall 73 directed at a right angle thereto, an arcuate wall 71 of a quarter circle, which wall has its center at the intersection of the top plate 72 with the upright wall 73, and side walls 74, 74 which surround the respective opposite sides of the top plate 72, upright wall 73, and arcuate wall 71. A pressure receiving plate 76 is housed in the air chamber 75. Shafts 77, 77 are journaled in bearings 78, 78 mounted in the corner portion 74a of the side walls 74, 74, so that the shafts 77, 77 may effect the pivotal movement. Confined between the shaft 77 and the shaft 77 is a coil spring 79. Loads upon the pressure receiving plate 76 are normally supported by a stopper (not shown) in the position B shown. In addition, the pressure receiving plate 76 if formed with a flange 76a at one of the its edges, while a clearance 80 is provided between the arcuate wall 71 of the air chamber 75 and the flange 76a. In addition, clearances 81, 81 are provided between pressure receiving plate 76 and side walls 74, 74 of the air chamber 75. An outlet 82 is provided in the top center portion of the arcuate wall 71, while inlet port 83 is provided in the bottom center portion thereof. Shown at 84, 85 are shock absorbing pieces provided to the pressure receiving plate 76 for absorbing the shock against the top plate 72 or the upright plate 73.

With the pressure smoothing means 70, when the pressure of the surging air being discharged from air pump 19 is raised to its maximum level, then the pressure receiving plate 76 rotates to the position A shown against the force of the coil spring 79, thereby lowering the pressure of the air which in turn is fed through the outlet 82 to the air-passage switching means 16. On the other hand, when the pressure of the surging air is lowered to its lowest level, then the pressure receiving plate 76 is lowered to the position B shown, thereby raising the pressure of the air which in turn is fed through the outlet 82 to the air-passage switching means 16.

As is apparent from the foregoing description of the pneumatic circuit according to the present invention, the surge pressure may be neutralized to a desired level, so that the vibration of the air-passage switching means and operating components may be minimized, with the accompanying prevention of unwanted sound arising therefrom.

The foregoing information and embodiments are presented herein for the illustrative purpose only and are not intended to unduly limit the scope of the invention.

What is claimed is:

1. In a pneumatic system including an air pump, air passage switching means and operating components, said air passage switching means being communicated with said air pump via a conduit and being communicated with each of said operating components for delivering pressurized air from said air pump to said operating components, the improvements comprising pressure smoothing means for smoothing the surge pressure being discharged from said air pump, said pressure smoothing means being between said air pump and said air-passage switching means and comprising:

a chamber defined by a circular top plate, a circular bottom plate having an air inlet which communicates with said air pump, and a cylindrical peripheral wall which has an air outlet communicating with said air-passage switching means and which surrounds said top plate and said bottom plate;

a partition wall dividing said chamber into an air chamber on one side thereof which faces said bottom plate and an oil chamber on the other side thereof which faces said top plate, said air chamber including said air inlet and said air outlet and said partition wall being parallel to said top plate;

a rod slidingly extending through said partition wall and said top plate in coaxial relation to said air inlet;

a piston secured to said rod within said oil chamber and having through-holes defined therein for oil;

a pressure receiving plate secured to said rod within said air chamber and having a periphery spaced from the peripheral wall of said air chamber to define a clearance therebetween, said pressure receiving plate being disposed in opposing relation to said air inlet;

a compression spring between said pressure receiving plate and said partition wall; and oil filled in said oil chamber.

* * * * *